(12) United States Patent
Coldrey et al.

(10) Patent No.: US 8,909,131 B2
(45) Date of Patent: Dec. 9, 2014

(54) REPEATER

(75) Inventors: Mikael Coldrey, Landvetter (SE); Patrik Persson, Grabo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 257 days.

(21) Appl. No.: 13/256,702

(22) PCT Filed: Apr. 29, 2009

(86) PCT No.: PCT/EP2009/055191
§ 371 (c)(1),
(2), (4) Date: Sep. 15, 2011

(87) PCT Pub. No.: WO2010/105699
PCT Pub. Date: Sep. 23, 2010

(65) Prior Publication Data
US 2012/0003925 A1    Jan. 5, 2012

Related U.S. Application Data

(60) Provisional application No. 61/161,821, filed on Mar. 20, 2009.

(51) Int. Cl.
| | | |
|---|---|---|
| G01S 5/14 | (2006.01) |
| H04B 1/38 | (2006.01) |
| H04M 1/00 | (2006.01) |
| H04W 88/04 | (2009.01) |
| H04B 7/155 | (2006.01) |
| H04W 84/04 | (2009.01) |
| H04W 28/04 | (2009.01) |
| H04W 16/28 | (2009.01) |

(52) U.S. Cl.
CPC ........... *H04W 88/04* (2013.01); *H04W 84/042* (2013.01); *H04B 7/1555* (2013.01); *H04W 28/04* (2013.01); *H04W 16/28* (2013.01)
USPC ............................................................. 455/7

(58) Field of Classification Search
CPC .............. H04Q 7/38; G01S 5/14; H04B 1/38; H04M 1/00
See application file for complete search history.

(56) References Cited

U.S. PATENT DOCUMENTS

| 5,875,396 A * | 2/1999 | Stockton et al. ........... 455/562.1 |
| 6,067,290 A | 5/2000 | Paulraj et al. |

(Continued)

FOREIGN PATENT DOCUMENTS

| EP | 1601223 A1 | 11/2005 |
| JP | 06244836 A | 9/1994 |

(Continued)

OTHER PUBLICATIONS

Official Action issued on Jul. 25, 2013 in corresponding Chinese Application No. 200980158358.4, 2 pages.

(Continued)

*Primary Examiner* — Bobbak Safaipour
(74) *Attorney, Agent, or Firm* — Rothwell, Figg, Ernst & Manbeck, P.C.

(57) ABSTRACT

The invention discloses a repeater (225; 325) for a cellular communications system (200, 300), the repeater (225; 325) comprising at least a first antenna with a first and a second antenna beam (226, 227). The repeater (225; 325) is arranged to shape at
least one of its antenna beams (226) electronically, so as to focus that antenna beam (226) on a first transmitting party (215) in the system (200, 300) while minimizing interference from other transmission sources (210).

20 Claims, 3 Drawing Sheets

(56) References Cited

U.S. PATENT DOCUMENTS

| | | |
|---|---|---|
| 6,782,277 B1 * | 8/2004 | Chen et al. .................. 455/562.1 |
| 7,809,074 B2 * | 10/2010 | Kotecha et al. ............... 375/267 |
| 8,098,710 B2 * | 1/2012 | Palanki et al. ................. 375/132 |
| 8,098,711 B2 * | 1/2012 | Palanki et al. ................. 375/132 |
| 8,429,506 B2 * | 4/2013 | Kotecha ........................ 714/776 |
| 2003/0169720 A1 | 9/2003 | Sebastian et al. |
| 2004/0104839 A1 | 6/2004 | Velazquez et al. |
| 2005/0164664 A1 * | 7/2005 | DiFonzo et al. ........... 455/277.1 |
| 2006/0017638 A1 * | 1/2006 | Guidon et al. ................ 343/757 |
| 2006/0040615 A1 * | 2/2006 | Mohamadi ...................... 455/25 |
| 2006/0232486 A1 * | 10/2006 | Guidon et al. ................ 343/757 |
| 2008/0045143 A1 | 2/2008 | Yoshida et al. |
| 2008/0187062 A1 * | 8/2008 | Pan et al. ...................... 375/260 |
| 2010/0214964 A1 * | 8/2010 | Larsson et al. ................ 370/277 |
| 2011/0142104 A1 * | 6/2011 | Coldrey et al. ............... 375/211 |

FOREIGN PATENT DOCUMENTS

| | | |
|---|---|---|
| JP | 2000-059291 A | 2/2000 |
| JP | 2003298496 A | 10/2003 |
| JP | 2007274271 A | 10/2007 |
| JP | 2008048236 A | 2/2008 |

OTHER PUBLICATIONS

Japanese Office Action from JP2012-500086, dated Apr. 10, 2013 with partial English Translation, 3 pages.

* cited by examiner

Fig 1

Prior Art

REPEATER

CROSS REFERENCE TO RELATED APPLICATION(S)

This application is a 35 U.S.C. §371 National Phase Entry Application from PCT/EP2009/055191, filed Apr. 29, 2009, and designating the United States, and which claims priority to U.S. Provisional Application No. 61/161,821, filed Mar. 20, 2009, the disclosures of which are incorporated herein in their entirety by reference.

TECHNICAL FIELD

The present invention discloses a repeater for a cellular communications system.

BACKGROUND

In many cellular communications systems, repeaters are used to enhance the communications channel between a controlling node of a cell and one or more users in the cell. In its simplest form, a repeater receives an incoming signal, amplifies it, and then forwards it towards a receiving party. A repeater will thus have at least two antenna beams, one for the incoming signal and one for the forwarded signal.

A repeater is a component which is usually installed on roof tops, walls, masts, etc. However, in order for the repeater to function properly, it is important that the repeater has a good channel to the transmitting party whose signals the repeater receives, amplifies and forwards. A good channel is ensured by letting the repeater's antenna beam for the incoming signal point towards the signal source, i.e. the transmitting party, in such a manner that, for example, Line-Of-Sight, LOS, is obtained.

If the repeater has a poor channel to the transmitting party, the repeater will not contribute to improved system performance. In fact, a poorly installed repeater might add more interference to the system, and thus even degrade the system performance.

Another factor which might cause degradation of system performance when a repeater is used is that the repeater will also amplify and forward any interfering signals which it receives.

SUMMARY

As has emerged from the description above, there is a need for a solution by means of which a repeater in a cellular communications system can be given a good channel to the transmitting party whose signals it forwards, whilst also giving the repeater a good ability to suppress interfering signals.

Such a solution is offered by the present invention in that it discloses a repeater for a cellular communications system which comprises at least a first antenna with a first and a second antenna beam.

The repeater of the invention is arranged to shape at least one of its antenna beams electronically, so as to focus that antenna beam on a first transmitting party in the system, while minimizing interference from other transmission sources.

Thus, the repeater of the invention is able to more easily and adaptively than previously known repeaters obtain an improved channel towards a transmitting party, while also adaptively suppressing interference.

In one embodiment, the repeater of the invention is additionally arranged to carry out its beam shaping and to receive instructions from another node in the system for optimizing said beam shaping.

In one embodiment, the repeater of the invention is arranged to optimize and carry out said beam shaping, i.e. without receiving instructions from other nodes in the system.

In one embodiment, the repeater of the invention is arranged to optimize the beam shaping by measuring a received desired signal and one or more interfering signals, and to use those measurements in order to carry out the beam shaping so as to maximize the SINR, Signal to Interference plus Noise Ratio, between the desired signal and the one or more interfering signals.

These and other embodiments and advantages of the invention will be described in more detail in the text below.

BRIEF DESCRIPTION OF THE DRAWINGS

The invention will be described in more detail in the following, with reference to the appended drawings, in which.

DETAILED DESCRIPTION

The invention will be described in detail below. Use will be made of terms which may be specific to the so called LTE system, Long Term Evolution, but it should be understood that this is merely in order to facilitate the reader's understanding of the invention and should not be used to limit the scope of protection sought for or given to the invention, since the invention can be used in a large number of different kinds of cellular communications systems, such as, for example, CDMA 2000 and TD SCDMA. The invention can also be applied in non-cellular wireless communications systems, such as, for example, WLAN systems.

Figure 1:
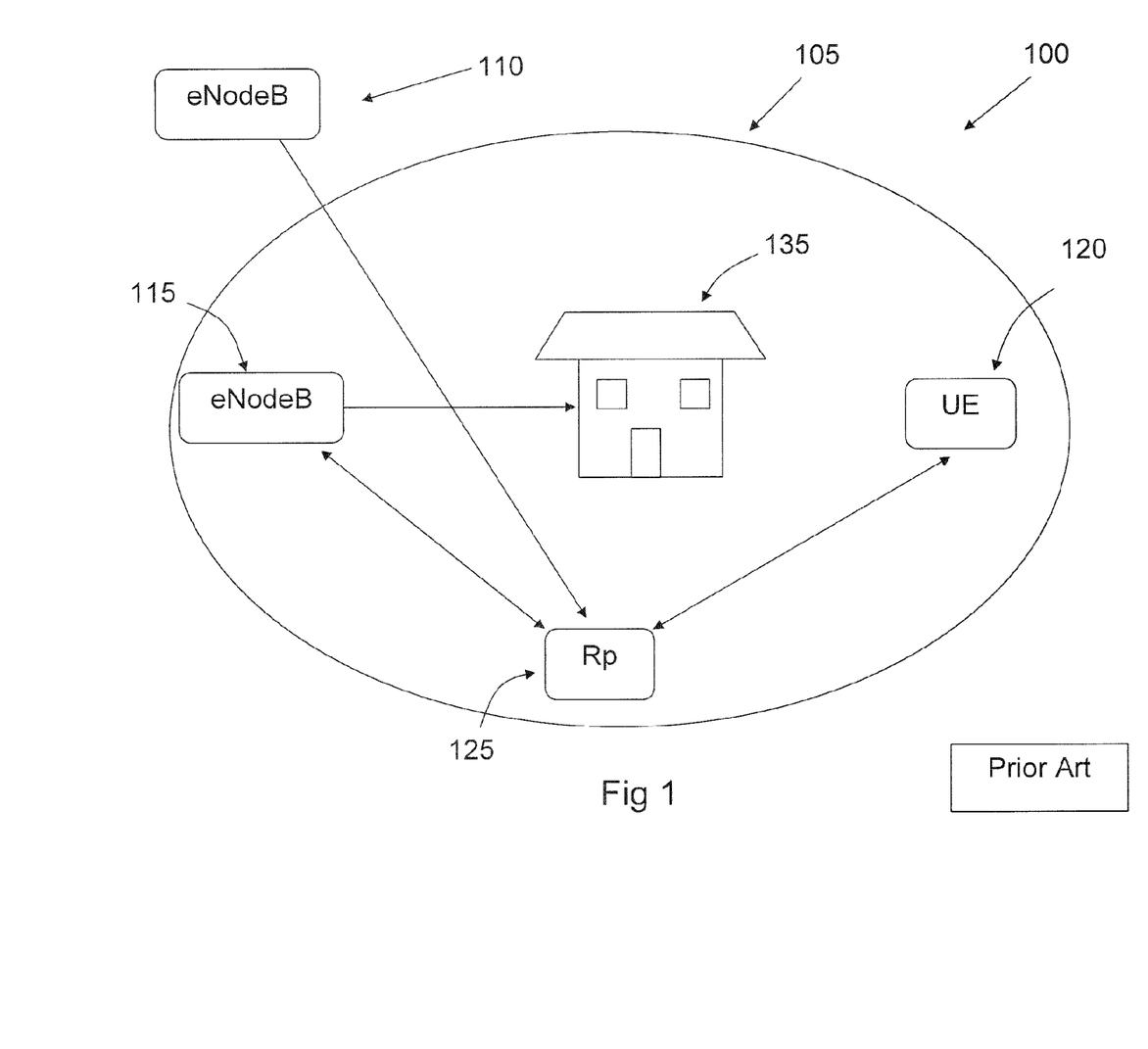
FIG. 1 shows a prior art system.

FIG. 1 shows a prior art LTE system 100 for cellular communication. As shown, the system 100 comprises a cell 105 in which there is a controlling node, an eNodeB 115, and at least one user, "User Equipment", UE 120. In the cell 105 there is also an obstacle 135, which prevents Line of Sight, LOS, between the eNodeB 115 and the UE 120.

In order to overcome the effect of the obstacle 135, there is arranged a repeater 125, "Rp". The repeater 125 is arranged to receive signals from the eNodeB 115 and to amplify and forward them to the UE 120, and to do the same with signals from the UE 120 to the eNodeB 115.

As shown, the repeater 125 also receives signals from an interfering source, here shown as an eNodeB 110 in an adjoining or adjacent cell. Naturally, this is only one example of a source of interfering signals, since many such sources can and will occur. Examples of other sources of interference which can be mentioned are user terminals in other cells, repeaters in other cells, as well as signal sources which belong to systems other than the system 100.

Figure 2:
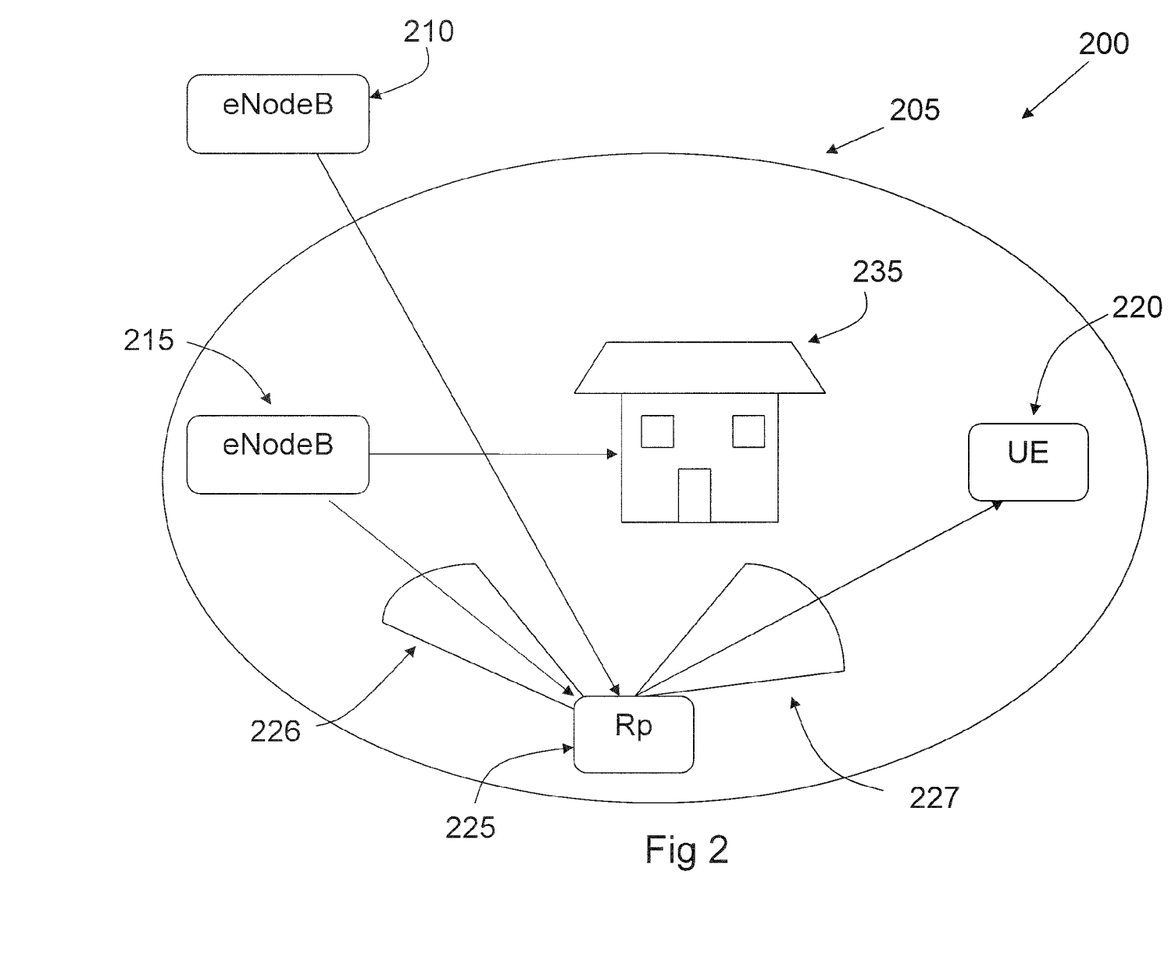
FIG. 2 shows a first embodiment of the invention.

Thus, the repeater 125 will receive desired signals from the eNodeB 115, at the same time as it will also receive interfering signals from other sources. This is a problem which the invention addresses by means of a solution which will be described below with reference to FIG. 2:

As shown in FIG. 2, the invention discloses a repeater 225 which has an antenna with a first 226 and a second 227 antenna beam, where at least the first antenna beam 226 is arranged to be shaped electronically, so that the antenna beam can be focused on a transmitting party such as the eNodeB 215, whilst reducing or suppressing the reception of interfering signals from sources such as the second eNodeB 210.

Beam shaping or beam forming as such is well known to those skilled in the field, and will for that reason not be described in depth here. However, suitably a group of antenna elements is used in order to carry out beam shaping, with different phase and amplitude being given to the signals to/from the different antenna elements in order to obtain the desired effect of the shaping or forming, e.g. increased directivity, of an antenna beam or beams.

Also, it should be noted that the term "antenna" is used in this description to denote a component which can form the beams described. Such a component can, as is well known to those skilled in the field, be either one physical component which comprises the antenna elements described above, or it can be a plurality of physical components in which the antenna elements are comprised. Thus, for example, the antenna described with two beams as described herein could be one or more physical components, and in fact, could in one embodiment be a first and a second "sub-antenna", one for each beam. The same is true for embodiments with more than two beams, i.e. an antenna with N beams can also be comprised of, for example, N sub antennas, one for each beam.

In one embodiment of the invention, the repeater 225 itself is arranged to carry out the beam shaping, i.e. the equipment necessary to carry out the beam shaping is comprised in the repeater 225, while the instructions for what the shaped beam or beams should look like are received from another node in the system, such as for example, the eNodeB 215. In such an embodiment, the repeater 225 or another node in the system is arranged to measure the strength of interfering signals and the direction they come from, and the results of the measurements are sent to the node which decides the shape of the beam 226, if they are not carried out in the measuring node, and the node which receives the results of the measurements then instructs the repeater 225 regarding how the beam 226 (or beams) should be shaped. As an alternative, the "instructing node" can also carry out the measurements in question.

In another embodiment, the repeater 225 is arranged both to decide what an optimal beam 226 should look like and to the carry out the beam shaping itself. In such an embodiment, the repeater 225 is arranged to decide the optimal beam shape by measuring a received desired signal and one or more interfering signals, and to use such measurements in order to carry out the beam shaping so as to maximize the SINR, Signal to Interference plus Noise Ratio, between the desired signal and the one or more interfering signals.

In a further embodiment, the repeater 225 is also arranged to shape the beam which is directed towards the receiving party, in this example the UE 220. This will be useful, if for example, the UE 220 moves. Naturally, these beam shaping functions can be "turned around" if the repeater 225 receives signals from the UE 220 for forwarding to the eNodeB 215.

In one embodiment, the repeater 225 is arranged to carry out its beam shaping in one plane, for example in the azimuth plane, whilst in another embodiment, the repeater 225 is arranged to carry out its beam shaping in two planes which are essentially perpendicular to each other, so that beam shaping can be performed in both the azimuth plane and in the elevation plane. This is decided by the amount of antenna elements that the repeater 225 has for each antenna beam 226, 227 and the complexity of the beam shaping equipment with which the repeater 225 is equipped.

The beam shaping of one or more of the beams 226, 227, of the repeater 225 can be done on different time scales, for example either when installing the repeater, or at predefined intervals, or adaptively during the operation of the system 200. If the beam shaping is done on a relatively slow time scale, then if the received interference level exceeds a predefined threshold, or if the SINR, the Signal to Interference and Noise Ratio, falls below a predefined threshold, the beam shaping needs to be updated.

Some notes on beam shaping will be given in the following:
Statistical Digital Beam Shaping One solution for beam shaping in the digital domain is briefly described below.

Suppose an antenna array is used as repeater "pick up" (receive) antenna, then the received signal at the repeater can be expressed as $$x(t)=a(\theta_0)s(t)+i(t), t=1,K,N$$

where $a(\theta)$ is the array response vector (of e.g. a standard uniform linear array) to the signal incident upon the array at the angle $\theta_0$, s(t) is the transmitted signal, and i(t) is a noise and/or interference impairment vector.

In order to favour a certain spatial direction over others, the received signal vector is processed by a spatial filter (beam shaping) and the output of the spatial filter is given by $$y(t)=w^H x(t)$$

There are multiple choices when selecting the beam shaping weight vector w. One choice is to choose the beam shaping such that it only maximizes the expected output power from the beam shaping filter. That is, $$w_{opt} = \arg\max_{w: w^H w=1} P_y = \arg\max_w w^H R_x w,$$

where $R_x$ is the covariance matrix of the received signal x(t) and is given by $$R_x = \sigma_x^2 a(\theta_0) a^H(\theta_0) + \sigma_n^2 I,$$

where we, for simplicity, have assumed spatially white noise/interference.

The solution is then given by $$w_{opt} = \frac{a(\theta_0)}{\|a(\theta_0)\|}, \quad (1)$$

i.e., one first needs to locate the maximum peak in the spectrum $$\hat{\theta}_0 = \arg\max_\theta P_y = \arg\max_\theta \frac{a^H(\theta) \hat{R}_x a(\theta)}{\|a(\theta)\|^2}$$

where it is assumed that the maximum peak corresponds to the direction of the signal of interest and where $\hat{R}_x$ is the sample covariance matrix $$\hat{R}_x = \frac{1}{N} \sum_{t=1}^N x(t) x^H(t) \quad (2)$$

and then the resulting beam shaping is given by inserting $\hat{\theta}_0$ into Eqn. (1). This kind of beam shaping that maximizes the output power is also a matched filter.

In situations with strong interference, for example from neighbouring RBSs or other repeater stations, a better alternative to the matched filter is the MVDR or Capon's beam shaping, which attempts to minimize any received interference while keeping a fixed gain in the direction of the signal of interest. The MVDR beam shaping is given by solving the following optimization problem $$w_{opt} = \underset{w}{\mathrm{argmin}}\, w^H R_x w \text{ s.t. } w^H a(\theta_0) = 1,$$

which has the solution $$w_{opt} = \frac{R_x^{-1} a(\theta_0)}{a^H(\theta_0) R_x^{-1} a(\theta_0)} \quad (3)$$

where $\theta_0$ is the direction of the signal of interest, e.g., the serving RBS. The beam shaping in (3) is commonly called adaptive beam shaping since it (compared to (1)) depends on the received signal x(t) via its covariance matrix (or rather an estimate of its covariance matrix (2)). Also note that the denominator in (3) is just for normalization purposes and as such does not affect the spatial properties of the beam shaping.

The direction $\theta_0$ is found by localizing the corresponding peak in the MVDR spectrum $$\hat{\theta}_0 = \underset{\theta}{\mathrm{argmax}}\, \frac{1}{a^H(\theta) \hat{R}_x^{-1} a(\theta)}$$

where it is assumed that the maximum peak corresponds to the direction of the signal of interest. One can of course also direct the beam in different directions by simply inserting a different $\theta_0$ into (3). The MVDR beam shaping has the advantage that it reduces the spatial interference from other directions by placing spatial nulls in the directions of these interferers. Since the MVDR beam shaping depends on the inverted sample covariance matrix it is required that the number of "snapshots" N in (2) is much larger than the number of antenna elements. In some cases regularization (e.g., diagonal loading) of the sample covariance matrix might also be needed to "robustify" the calculation of the MVDR beam shaping.

Advanced Repeater with Channel and Interference Knowledge

Observe that the MVDR beam shaping weights (3) only depend on the second order statistics of the received signal and not any known reference signals. Thus, there is no need for using reference signals (pilots) to retrieve the beam shaping weights. In other words, we can call it "blind". However, the statistical beam shaping needs to know the direction of the signal of interest, and one assumption is, as previously described, that the direction corresponds to the largest peak in the beam forming spectrum. If an interfering signal is stronger than the signal of interest, this will lead to a erroneous beam shape which instead minimizes the SINR. However, if the repeater is advanced enough to estimate the wireless channel and its interference from reference signals embedded in some control channel, then it can of course instead use the channel and interference estimates to construct beam shaping that maximized e.g. the SINR. Assume that the channel of the signal of interest has been estimated by using some reference signal and that it is given by $$h = \hat{a}(\theta_0)$$

and let further assume that the covariance matrix of the interference also has been estimated in the presence of a known reference signal $s_r(t)$ by using e.g.

$$\hat{R}_i = \frac{1}{N} \sum_{t=1}^{N} (x(t) - h(\theta_0) s_r(t))(x(t) - h(\theta_0) s_r(t))^H$$

or simply by only listening to the interference in the absence of a signal of interest (e.g. when the supporting RBS is quiet). Of course, the repeater can also estimate the interfering channels by measuring control signals from interfering control channels.

$$\hat{R}_i = \frac{1}{N} \sum_{t=1}^{N} i(t) i(t)^H$$

The SINR maximization problem is given by $$\underset{w}{\max}\, \frac{w^H R_s w}{w^H R_i w} \text{ where } R_s = \sigma_s^2 h h^H \quad (4)$$

Problem (4) is equivalent to minimizing the interference plus noise power while keeping a fixed gain to the signal of interest, i.e., $$w_{opt} = \underset{w}{\mathrm{argmin}}\, w^H R_i w \text{ s.t. } w^H h = 1$$

which has the solution (simply replace the covariance matrix in (3) by the interference plus noise covariance matrix)

$$w_{opt} = \frac{R_i^{-1} h}{h^H R_i^{-1} h} \quad (5)$$

The beam shaping in (5) is based on channel and interference knowledge that has been attained from reference signalling which thus makes the repeater more advanced since it has to be able to perform channel and interference estimation. However, it is therefore more likely to perform better than a "blind" repeater that only exploits signal statistics. Also note that it is very similar to the MVDR beam shaping (3) and hereafter we will therefore refer to it as modified MVDR beam shaping.

Advanced Repeater with Multi Stream Receive Beam Shaping

If the received signal is constituted of multiple streams, i.e. if there is a ongoing MIMO transmission between the base station and user, then it is desired that the repeater can forward these multiple streams while maintaining some receive interference rejection. The repeater would then apply individual beam shaping to each data stream, where the individual beam shaping would attempt to reduce spatial interference from interfering nodes and inter stream interference (interference that one stream yields to another). Assume that the MIMO channel matrix is available, then the repeater may apply the following Linear Minimum Mean Square Error (LMMSE) receive filtering matrix to the received signal vector:

$$y = W^H x$$

The beam shaping matrix is given by $$W=(HH^H+R_i)^{-1}H \quad (6)$$

where H is the MIMO channel matrix, and $R_i$ is the interference plus noise covariance matrix. The LMMSE beam shaping matrix will, in a minimum mean square sense, use the multiple receive antennas to try to undo the mixing of the multiple streams that the channel has introduced and at the same time suppress any other spatial interference. Moreover, if the channel matrix is rank one, say H=h, then the LMMSE beam shaping of (6) can be rewritten using the "Woodbury's identity", as $$w_{LMMSH}=\eta w \quad (7)$$

where $w_{LMMSE}$ is the rank one beam shaping given by (7), $\eta$ is a positive real-valued scalar, and w is the modified MVDR beam shaping given by (5).

Thus in the rank one (single stream) case, the LMMSE and modified MVDR beam shaping are just scaled versions of each other.

Other Array Geometries

One dimensional digital beam shaping can also be extended to multidimensional arrays, e.g. planar arrays. By using e.g. planar arrays, beam shaping can be done also in the elevation domain, by for example using extensions of the conventional beam shaping technique described above or the MVDR beam shaping. The corresponding spectra are then 2-dimensional, i.e. usually azimuth and elevation.

Dual Polarized Antennas

If the repeater has dual polarized antennas, then one would apply dual beam shaping; in principle individual beam shaping for each polarization. The individual beam shaping may be found according to the single polarized methods described previously in this text.

Regarding the solutions and models for beam shaping given above, it has been assumed throughout that the signal model used is narrowband. However, an LTE system uses a rather wide spectrum for its so called resource blocks, where each resource block comprises a number of so called sub carriers. In order to be able to apply the solutions and models given above for beam shaping, one choice would be to implement individual beam shaping for different frequency "sub-bands" such as an individual LTE sub carrier, or a collection of adjacent LTE sub carriers.

However, it can also be noted that if it is desired to only forward certain frequency sub bands and/or if it is desired to apply different beam formers to different frequency sub bands, then frequency dependent beam formers are needed. This is typically done on individual or groups of adjacent sub carrier level.

Also, as an alternative to "electronic" beam shaping, i.e. influencing the amplitude and phase of the transmitted signals, use can be made of an antenna with a set of fixed beams, where each beam is designed to support different fixed signal sources by having "strong" fixed beams in the directions of these sources, while at the same time having nulls in the directions of fixed interference sources.

The repeater can then choose the appropriate beam among this set of fixed beams. Preferably, the set of fixed beams is tailored to each specific site installation, so that the beams are designed to support and suppress signals and interference from fixed sources, e.g., from eNodeBs or other repeaters. In fact, one can use the adaptive beam shaping outlined above when designing the set of fixed beams, by pointing the main beam in different desired directions and using the remaining degrees of freedom to suppress static interference. This can be done during the repeater installation process.

Load Sharing

Figure 3:
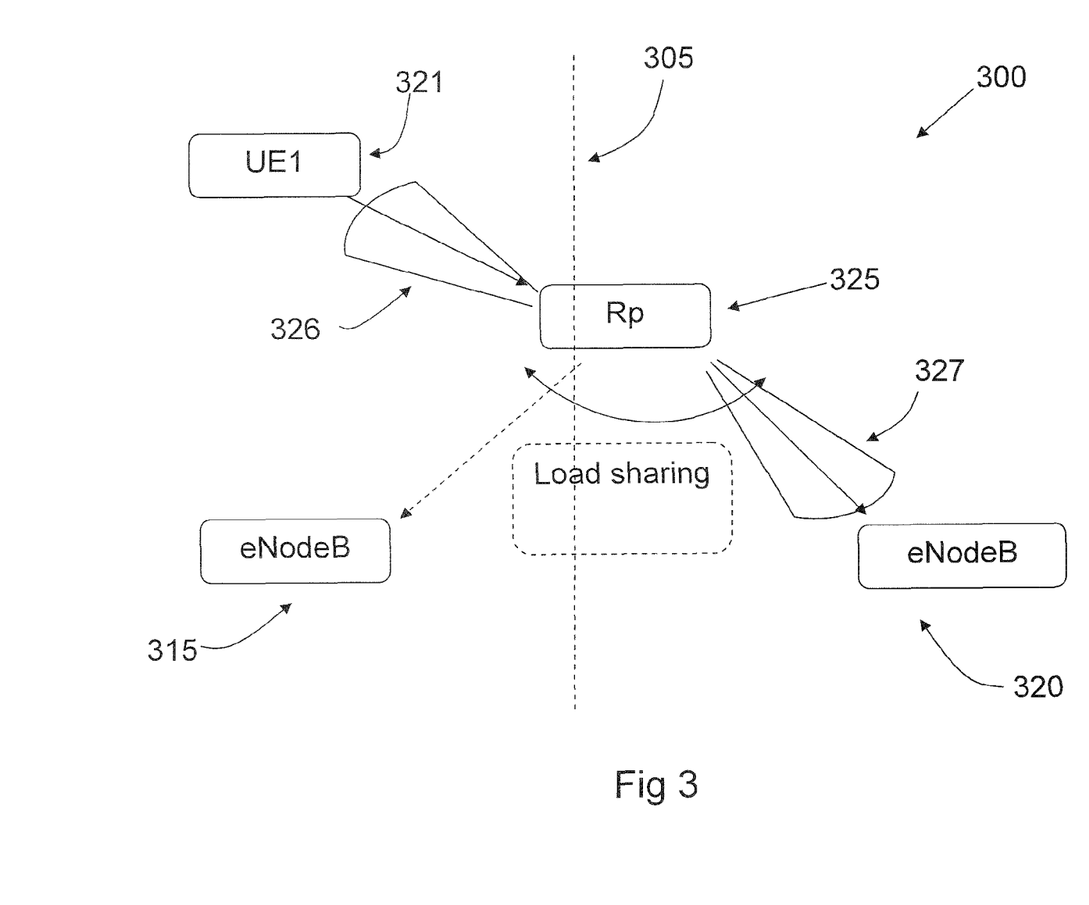
FIG. 3 shows a second embodiment of the invention.

FIG. 3 schematically shows a further embodiment of a repeater 325 of the invention and one of its functions: the repeater 325 is arranged to have at least two antenna beams 326, 327, which can be shaped, as described above. However, the repeater 325 is arranged so that it can be used for so called "load sharing" between two different eNodeBs, 315, 320:

Assume that the repeater 325 is, for example, positioned at or close to the border, shown as 305, between two adjacent cells in a system 300, where the first eNodeB 315 is used for one of the adjacent cells, and the other eNodeB 320 is used for the other of the two adjacent cells.

Also assume that the eNodeB of one of the cells, for example the eNodeB 315, has a high load, i.e. the amount of traffic in its cell is close to the limit, while the other eNodeB, i.e. the eNodeB 320, has a fair amount of spare capacity, i.e. a low load. In such a case, the repeater 325 can forward signals to and from a UE, such as the UE 321, which is geographically located in the cell of the highly loaded eNodeB 315, so that the signals are forwarded to and from the eNodeB which has spare capacity, i.e. in this case the eNodeB 320. This can be achieved since the repeater 325 is arranged to shape its beams 326, 327, so that they can be directed in more or less any direction, at least in the azimuth plane.

Another way of looking at this is that one or more UEs 321 can be "re-located" virtually to another cell by means of the repeater 325. The exact mechanism for when this is to be done can vary within the scope of the invention, but in one embodiment the eNodeBs 315, 320 report their load situation at regular intervals to the repeater 325, which is arranged to compare the two "load situations" and to see if one or more UEs need to be "moved virtually" by means of the mechanism described previously.

As an alternative, the eNodeBs can be arranged to send "distress calls" to the repeater 325, i.e. to inform the repeater that the eNodeB is at or close to its load limit, so that the repeater can "virtually move" one or more UE to the other eNodeB. As yet another alternative, the instructions to move UEs virtually can come from a node which is used to control the function of one or more of the eNodeBs in the system 300. Such a signal can come directly to the repeater 325 from the controlling node, or it can be forwarded via one of the eNodeBs.

The invention is not limited to the examples of embodiments described above and shown in the drawings, but may be freely varied within the scope of the appended claims.

The invention claimed is:

1. A repeater for a cellular communications system, the repeater comprising at least a first antenna with a first and a second antenna beam, the repeater being arranged to shape at least one of said antenna beams electronically to focus that antenna beam on a first transmitting party in the system while minimizing interference from other transmission sources.

2. The repeater of claim 1, additionally being arranged to carry out said beam shaping and being arranged to receive instructions from another node in the system for optimizing said beam shaping.

3. The repeater of claim 1, additionally being arranged to optimize and carry out said beam shaping.

4. The repeater of claim 3, also being arranged to optimize the beam shaping by measuring a received desired signal and one or more interfering signals, and being arranged to use such measurements in order to carry out said beam shaping so as to maximize the SINR, Signal to Interference plus Noise Ratio, between the desired signal and the one or more interfering signals.

5. The repeater of claim 1, being arranged to carry out said beam shaping in a first plane.

6. The repeater of claim 5, being arranged to also carry out said beam shaping in a second plane which is essentially perpendicular to the first plane.

7. The repeater of claim 6, in which the first plane is the azimuth plane and the second plane is the elevation plane.

8. The repeater of claim 1, being arranged to receive an incoming signal, amplify said signal, and forward said signal to a receiving party.

9. The repeater of claim 1, being arranged to shape at least one of said antenna beams electronically to focus that antenna beam on a receiving party.

10. The repeater of claim 1, being arranged to shape at least one of said antenna beams on different time scales.

11. The repeater of claim 1, being arranged to measure a received interference level, and being arranged to update said beam shaping if said received interference level exceeds a predefined threshold.

12. The repeater of claim 1, being arranged to measure a received desired signal and one or more interfering signals, and being arranged to update said beam shaping if the SINR, Signal to Interference plus Noise Ratio, between the desired signal and the one or more interfering signals, falls below a predefined threshold.

13. The repeater of claim 1, wherein the first transmitting party is a base station.

14. A method performed by a repeater comprising an antenna with a first antenna beam and a second antenna beam, the method comprising:
   the repeater shaping said first antenna beam to focus said first antenna beam on a base station;
   the repeater receiving a signal transmitted by said base station;
   the repeater amplifying said received signal;
   the repeater using the second antenna beam to transmit the amplified signal.

15. The method of claim 14, wherein the step of shaping said first antenna beam comprises: measuring the signal transmitted by the base station and an interfering signal, using said measurements to determine a desired beam shape, and shaping the beam so that it matches the desired beam shape.

16. The method of claim 14, further comprising:
   the repeater shaping said second antenna beam to focus said first antenna beam on a user equipment communicating with the base station.

17. The method of claim 14, wherein the step of shaping said first antenna beam comprises: receiving from a node information identifying a desired beam shape, and then shaping the beam so that it matches the desired beam shape.

18. The method of claim 17, wherein said node is said base station.

19. The method of claim 14, further comprising:
   the repeater receiving a signal transmitted from a user equipment located in a cell served by said base station;
   the repeater determining whether e received signal from the user equipment should be forwarded to a second base station;
   the repeater, in response to determining that the received signal from the user equipment should be forwarded to a second base station, shaping said first antenna beam to focus said first antenna beam on said second base station.

20. The method of claim 19, further comprising:
   the repeater receiving from said first base station a first load report; and
   the repeater receiving from said second base station a second load report, wherein
   the repeater makes the determination as to whether the received signal from the user equipment should be forwarded to a second base station based on said first and second load reports.

* * * * *

UNITED STATES PATENT AND TRADEMARK OFFICE
CERTIFICATE OF CORRECTION

PATENT NO. : 8,909,131 B2
APPLICATION NO. : 13/256702
DATED : December 9, 2014
INVENTOR(S) : Coldrey et al.

Page 1 of 1

It is certified that error appears in the above-identified patent and that said Letters Patent is hereby corrected as shown below:

In the specification

In Column 2, Line 8, delete "SINR." and insert -- SINR, --, therefor.

In Column 2, Line 39, delete "Sight." and insert -- Sight, --, therefor.

In Column 7, Line 14, in Equation (7), delete "$w_{LMMSH}$" and insert -- $w_{LMMSE}$ --, therefor.

In the claims

In Column 10, Line 19, in Claim 19, delete "whether e" and insert -- whether the --, therefor.

Signed and Sealed this
Twenty-eighth Day of June, 2016

Michelle K. Lee
*Director of the United States Patent and Trademark Office*